(12) United States Patent
Fletcher et al.

(10) Patent No.: US 7,266,946 B2
(45) Date of Patent: Sep. 11, 2007

(54) GAS FUEL COMPRESSION BY LIQUIFICATION

(75) Inventors: Paul Fletcher, Rugby (GB); James I Oswald, Hinckley (GB)

(73) Assignee: Rolls-Royce plc, London (GB)

( * ) Notice: Subject to any disclaimer, the term of this patent is extended or adjusted under 35 U.S.C. 154(b) by 292 days.

(21) Appl. No.: 11/001,130

(22) Filed: Dec. 2, 2004

(65) Prior Publication Data
US 2005/0126179 A1    Jun. 16, 2005

(30) Foreign Application Priority Data
Dec. 13, 2003    (GB) ................................. 0328949.3

(51) Int. Cl.
*F02C 7/14* (2006.01)
*F02C 7/141* (2006.01)
*F02C 7/224* (2006.01)

(52) U.S. Cl. .............................. 60/785; 60/728; 60/736
(58) Field of Classification Search ................ 60/728, 60/782, 785, 736, 266, 267
See application file for complete search history.

(56) References Cited
U.S. PATENT DOCUMENTS 2,718,753 A * 9/1955 Bridgeman ................. 60/736
3,705,496 A   12/1972 Wolf
5,511,374 A * 4/1996 Glickstein et al. ............ 60/782
6,253,554 B1* 7/2001 Kobayashi et al. ........... 60/736
6,415,595 B1* 7/2002 Wilmot et al. ................ 60/736
6,817,187 B2* 11/2004 Yu .............................. 60/736

FOREIGN PATENT DOCUMENTS

| DE | 197 44 456 AB | 1/1999 |
| GB | 0 843 928 SP  | 8/1960 |
| GB | 0 870 265 SP  | 6/1961 |
| GB | 0 874 251 SP  | 8/1961 |
| GB | 1 117 738 SP  | 6/1968 |
| GB | 2 295 858 A   | 6/1996 |
| GB | 2 350 158 A   | 11/2000 |

* cited by examiner

*Primary Examiner*—Ted Kim
(74) *Attorney, Agent, or Firm*—W. Warren Taltavull; Manelli Denison & Selter PLLC

(57) ABSTRACT

An apparatus for supplying inlet gas 29 and fuel 17 to a gas turbine engine 10, the apparatus comprising: a heat exchanger 28 for transferring thermal energy from the inlet gas 29 to a fuel 17 for the gas turbine engine 10, the heat exchanger 28 comprising a first input for receiving fuel 17, a second input for receiving inlet gas 29, a first output for providing inlet gas 31 after heat exchange to the gas turbine engine 10 and a second output for providing fuel 33 after heat exchange to the gas turbine engine 10.

14 Claims, 1 Drawing Sheet

GAS FUEL COMPRESSION BY LIQUIFICATION

FIELD OF THE INVENTION

Currently natural gas fuel may be liquefied to facilitate its storage and transportation. This is known as "liquefied natural gas" or "LNG" in the art. LNG is usually heated before it is input into a combustor of a gas turbine engine, to change its phase from a liquid to a gas. It is also known to compress the gas fuel in order to get it to a high enough pressure for entry into the combustor. In order to increase the efficiency of a gas turbine engine, the inlet gas to the compressor may be cooled. The cooling of the inlet gas allows the engine to run to a higher pressure ratio. The inlet gas may be cooled by a refrigeration means or by storage of a cold substance such as ice.

BACKGROUND OF THE INVENTION

Where gas supply pressures are low, the compression of gas fuel requires expensive compressors. The energy consumption of a gas fuel compressor may be a large fraction of the output energy of the engine. For example, a 50 megawatt engine may require 2 megawatts to compress the gas fuel.

Therefore, it is desirable to provide an alternative apparatus and method for compressing the gas fuel and for cooling the inlet gas.

SUMMARY OF THE INVENTION

According to one aspect of the present invention there is provided an apparatus for supplying inlet gas and fuel to a gas turbine engine, the apparatus comprising: a heat exchanger for transferring thermal energy from the inlet gas to a fuel for the gas turbine engine, the heat exchanger comprising a first input for receiving fuel, a second input for receiving inlet gas, a first output for providing inlet gas after heat exchange to the gas turbine engine and a second output for providing fuel after heat exchange to the gas turbine engine.

The inlet gas may be provided to a compressor of the gas turbine engine. The fuel may be provided to a combustor of the gas turbine engine. One benefit provided by embodiments of the present invention is that the inlet gas to the gas turbine engine is cooled by the fuel, thereby increasing the power and efficiency of the gas turbine engine.

The apparatus may further comprise a pump for pumping the fuel to a pressure level above a threshold value for entering the gas turbine engine. The energy for pumping fuel is usually extracted from the electrical output of the engine, since pumping the fuel as a liquid requires less energy, the efficiency of the engine is increased.

The apparatus may additionally comprise a further heat exchanger, wherein the further heat exchanger comprises a first input for receiving gas from the gas turbine engine, a second input for receiving fuel and an output for providing fuel after heat exchange to the heat exchanger, wherein, in use, the further heat exchanger transfers thermal energy from the gas to the fuel.

The fuel provided to the further heat exchanger may be a liquefied fuel. Beneficially, the liquefied fuel may be vaporised by the further heat exchanger. This may aid the cooling of the extracted gas and transform the fuel into a gas. Alternatively, the fuel may be vaporised by the heat exchanger.

According to a further aspect of the present invention there is provided a method of supplying inlet gas and fuel to a gas turbine engine, the method comprising: transferring thermal energy from the inlet gas to the fuel for the gas turbine engine.

According to another aspect of the present invention there is provided an apparatus for cooling a fuel for a gas turbine engine, the apparatus comprising: cooling means for receiving gas from the gas turbine engine and reducing the thermal energy of the gas; a heat exchanger for transferring thermal energy from the fuel to the gas, comprising a first input for receiving the gas from the cooling means and a second input for receiving the fuel.

The cooling means may be a turbine. The turbine may be a turbine of the gas turbine engine or an external turbine. The turbine may expand the gas to reduce its thermal energy and convert it to electrical energy. The cooling means may be electrically connected to a load and may supply electrical energy to the load. The load may comprise electrical components such as pumps and/or fans. Therefore a benefit provided by embodiments of present invention is the reduction of thermal energy of the gas and the supply of electrical energy to auxiliary components. The turbine may liquefy the gas, in which case, the transfer of energy in the heat exchanger may be more efficient.

The apparatus may additionally comprise a further heat exchanger, wherein the further heat exchanger comprises a first input for receiving gas from the gas turbine engine, a second input for receiving fuel and an output for providing the gas after heat exchange, to the cooling means, wherein, in use, the further heat exchanger transfers thermal energy from the gas to the fuel.

The heat exchanger may comprise an output for exhausting the gas. The heat exchanger may also comprise an output for providing the fuel to the further heat exchanger via a pump.

According to a further aspect of the present invention there is provided a method of cooling a fuel for a gas turbine engine, the method comprising: cooling gas from the gas turbine engine to provide cooled gas; and cooling the fuel by transferring thermal energy from the fuel to the cooled gas to provide cooled fuel.

According to another aspect of the present invention there is provided a fuel and inlet gas supply system for a gas turbine engine, the system comprising: means for cooling gas from the gas turbine engine to provide cooled gas; means for cooling fuel for the gas turbine engine using the cooled gas to provide cooled fuel; means for cooling inlet gas using the cooled fuel and then providing said fuel and cooled inlet gas to the gas turbine engine.

According to a further aspect of the present invention there is provided a method of supplying inlet gas and fuel to a gas turbine engine, the method comprising: cooling gas from the gas turbine engine to provide cooled gas; cooling fuel for the gas turbine engine using the cooled gas to provide cooled fuel; cooling inlet gas using the cooled fuel and then providing said fuel and cooled inlet gas to the gas turbine engine.

The gas referred to in the preceding paragraphs may be air.

BRIEF DESCRIPTION OF THE DRAWINGS

For a better understanding of the present invention reference will now be made by way of example only to the accompanying drawing in which.

DETAILED DESCRIPTION OF THE INVENTION

Figure 1:
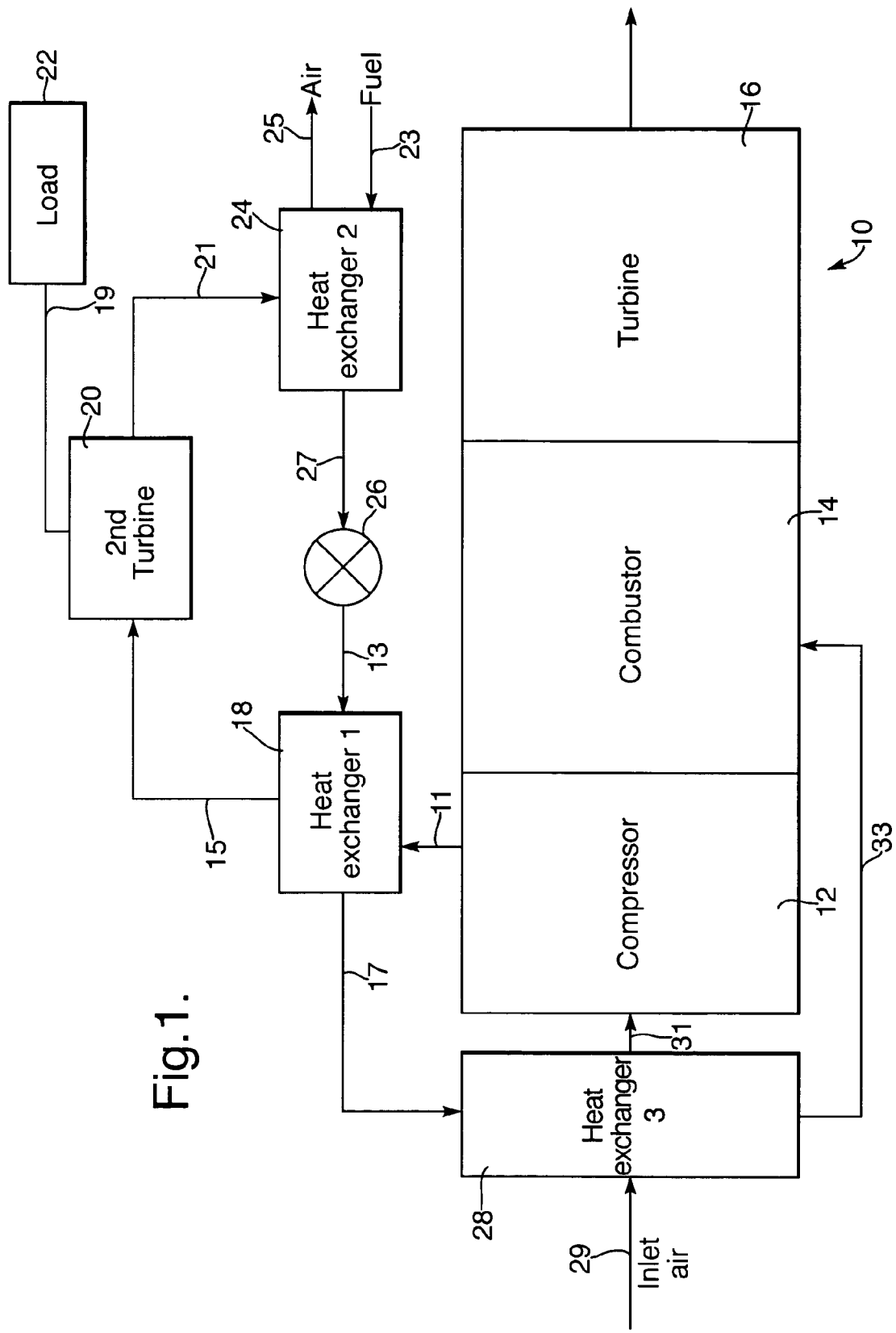
FIG. 1 illustrates an apparatus for supplying inlet gas and fuel to a gas turbine engine according to one embodiment of the present invention.

The FIGURE illustrates an apparatus for supplying inlet gas 29 and fuel 17 to a gas turbine engine 10, the apparatus comprising: a heat exchanger 28 for transferring thermal energy from the inlet gas 29 to a fuel 17 for the gas turbine engine 10, the heat exchanger 28 comprising a first input for receiving fuel 17, a second input for receiving inlet gas 29, a first output for providing inlet gas 31 after heat exchange to the gas turbine engine 10 and a second output for providing fuel 33 after heat exchange to the gas turbine engine 10.

In general, FIG. 1 illustrates a gas turbine engine 10. The gas turbine engine 10 comprises a compressor 12, a combustor 14 and a turbine 16. The gas turbine engine 10 operates in a standard fashion whereby air is received by the compressor 12, mixed with a gas fuel mixture which is burned in the combustor 14 and then expanded in a turbine 16 and finally exhausted.

In more detail, FIG. 1 illustrates that gas 11 is bled from the compressor 12 to a first heat exchanger 18. The gas 11 is, in this example, air 11. The air 11 is bled from a compartment of the compressor that has a low gas temperature. The air 11 may be bled from anyone of a plurality of compartments of the compressor depending upon the gas temperature of that compartment. The first heat exchanger 18 has two inputs, an input for the air 11 and an input for a liquefied fuel 13. The liquefied fuel 13 is, in this example, a liquefied natural gas (LNG) 13. Thermal energy is transferred from the air 11 to the liquefied fuel 13, thereby vaporising the liquefied fuel 13. The first heat exchanger 18 comprises an output for vaporised fuel 17. The first heat exchanger 18 reduces the temperature of the air 11 to approximately 20° C., and provides cooled air 15 from an output.

The cooled air 15 is received by a cooling means 20. The cooling means 20 is, in this example, a second turbine. The second turbine may be an external turbine (as illustrated) or may be integrated with the turbine 16. The second turbine 20 expands the cooled air 15, reducing the temperature to approximately −180° C. The cooled air 15 may be liquefied by the second turbine 20. Electrical energy 19 is extracted from the second turbine 20 and used to power a load 22. The load 22 may comprise components such as pumps, fans or other auxiliary components.

Air 21 is provided from an output of the second turbine 20 to an input of a second heat exchanger 24. The second heat exchanger 24 also comprises an input for a gas fuel 23. Thermal energy is transferred from the gas fuel 23 to the air 21, thereby liquefying the gas fuel 23. The efficiency of the transfer of thermal energy in the second heat exchanger may be improved if the air 21 is liquefied. Liquefied fuel 27 is provided to a pump 26 via an output of the second heat exchanger 24. The liquefied fuel 27 is pumped by the pump 26 up to a pressure level that is above a threshold value for entering the gas turbine engine. Air 25 is exhausted from an output of the second heat exchanger 24 to the atmosphere.

The liquefied fuel 13 is received by the heat exchanger 18 and vaporised by the air 11 as described in the preceding paragraphs.

The fuel 17 is provided to an input of a third heat exchanger 28. The third heat exchanger 28 also comprises an input for the inlet gas 29 for the gas turbine engine 10. The inlet gas 29 is, in this example, inlet air 29. Thermal energy is transferred from the inlet air 29 to the fuel 17, thereby reducing the temperature of the inlet air 29. Inlet air 31 is then exhausted from an output of the third heat exchanger 28 to the compressor 12 of the gas turbine engine 10. The efficiency of the engine increases with the decrease in the temperature of the inlet air 31. Fuel 33 is then input into the combustor 14 of the gas turbine engine 10.

The advantages provided by embodiments of the invention are that since the temperature of the gas fuel is decreased, there is a proportionate reduction in the power required by the pump 26. Furthermore, the inlet air 29 is cooled by the fuel 17 in the third heat exchanger 28 thereby increasing the efficiency and power of the engine.

Although embodiments of the present invention have been described in the preceding paragraphs with reference to various examples, it should be appreciated that modifications to the examples given can be made without departing from the scope of the invention as claimed. For example, the gas fuel does not have to be liquefied in the heat exchanger 24 since any reduction in fuel temperature proportionately decreases the power consumption of the pump 26. The fuel 23 may be a depleted gas or be derived from a renewable energy source. The first heat exchanger 18 may be absent from the apparatus. In which case, the fuel is vaporised by the third heat exchanger 28 and the gas 11 is cooled solely by the second turbine 20. The fuel 23 may be liquefied prior to transportation to the gas turbine engine 10. This would allow the first heat exchanger 18, the second heat exchanger 24 and the second turbine 20 to be absent from the apparatus. Additionally, embodiments of the present invention may be used in an engine for a helicopter, turbo-prop or for a high speed propulsion engine.

Reference numerals within parentheses are provided in the claims to aid understanding of the claims. The reference numerals are not intended to limit the scope of protection conferred by the claims.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A gas turbine engine comprising a compressor, a combustor, a turbine and an apparatus for supplying inlet gas to the compressor of the gas turbine engine and fuel to the combustor of the gas turbine engine, the apparatus comprising a first heat exchanger, a second heat exchanger and cooling means, the cooling means receiving gas bled from the compressor of the gas turbine engine, the cooling means reducing the thermal energy of the gas, the first heat exchanger comprising a first input for receiving the gas from the cooling means and a second input for receiving a fuel, the first heat exchanger transferring thermal energy from the fuel to the gas, the second heat exchanger comprising a first input for receiving inlet gas from the compressor, the second heat exchanger transferring thermal energy from the inlet gas to the fuel, a first output of the second heat exchanger providing inlet gas to the compressor of the gas turbine engine and a second output of the second heat exchanger providing fuel to the combustor of the gas turbine engine.

2. A gas turbine engine as claimed in claim 1, further comprising a pump for pumping the fuel to a pressure level above a threshold value for entering the gas turbine engine.

3. A gas turbine engine as claimed in claim 1, wherein the cooling means comprises a further heat exchanger, wherein the further heat exchanger comprises a first input for receiving gas bled from the compressor of the gas turbine engine, a second input for receiving fuel from the first heat exchanger, a first output for providing fuel to the first input of the second heat exchanger, a second output for providing gas to the cooling means, the further heat exchanger transfers thermal energy from the gas bled from the compressor to the fuel.

4. A gas turbine engine as claimed in claim 3, wherein the fuel provided to the further heat exchanger is a liquefied fuel.

5. A gas turbine engine as claimed in claim 4, wherein the pump provides liquefied fuel to the further heat exchanger.

6. A gas turbine engine as claimed in claim 4, wherein the liquefied fuel is vaporised by the further heat exchanger.

7. A gas turbine engine as claimed in claim 1, wherein the cooling means is a turbine.

8. A gas turbine engine as claimed in claim 7, wherein the turbine is a turbine of the gas turbine engine or an external turbine.

9. A gas turbine engine as claimed in claim 1, wherein the cooling means is electrically connected to a load and supplies electrical energy to the load.

10. A method of supplying inlet gas to the compressor of a gas turbine engine and fuel to the combustor of a gas turbine engine, the method comprising bleeding gas from the compressor of the gas turbine engine, cooling the gas bled from the compressor of the gas turbine engine to provide cooled gas, transferring thermal energy from a fuel to the cooled gas in a first heat exchanger to provide cooled fuel, transferring thermal energy from the inlet gas to the cooled fuel in a second heat exchanger, providing the cooled inlet gas to the compressor of the gas turbine engine and providing said fuel to the combustor of the gas turbine engine.

11. A method as claimed in claim 10 comprising cooling the gas bled from the compressor in a turbine.

12. A method as claimed in claim 11 comprising cooling the gas bled from the compressor by transferring thermal energy from the gas bled from the compressor to the fuel in a further heat exchanger supplying the gas to the turbine and supplying the fuel to the second heat exchanger.

13. A method as claimed in claim 12 wherein the first heat exchanger provides liquefied fuel.

14. A method as claimed in claim 13 wherein the further heat exchanger provides vaporized fuel.

* * * * *